T. J. MAYALL.
Fumigators for Hospitals and other Uses.

No. 143,583. Patented Oct. 14, 1873.

Witnesses

Inventor.

UNITED STATES PATENT OFFICE.

THOMAS J. MAYALL, OF BOSTON, MASSACHUSETTS.

IMPROVEMENT IN FUMIGATORS FOR HOSPITAL AND OTHER USES.

Specification forming part of Letters Patent No. 143,583, dated October 14, 1873; application filed September 1, 1873.

*To all whom it may concern:*

Be it known that I, THOMAS J. MAYALL, of Boston, Suffolk county, Massachusetts, have invented a new and Improved Portable Fumigator for Hospital and other Uses, of which the following is a specification:

The hand or portable fumigator which I have invented is simple of construction and effective in operation. It is designed, principally, with a view to the use of carbolic acid—a disinfectant of well-known virtue. The acid is contained in a cup or vessel within a larger vessel intended to contain water. This water, being heated, will cause evaporation of the acid. The steam from the water and the fumes of the acid mingle together and pass off through a perforated cover to unite with the air of the room to be fumigated or disinfected.

Figure 1:
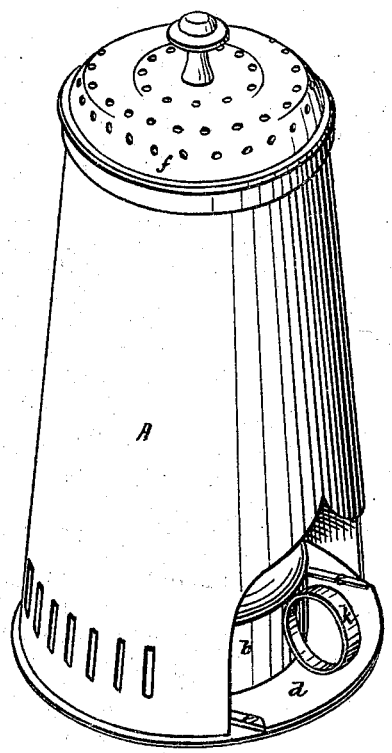
Figure 2:
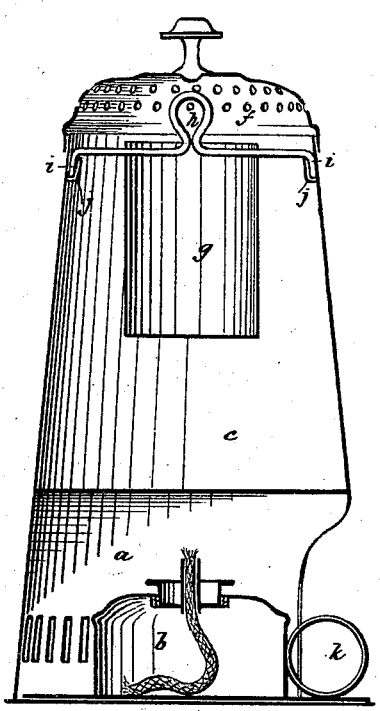
Figure 3:
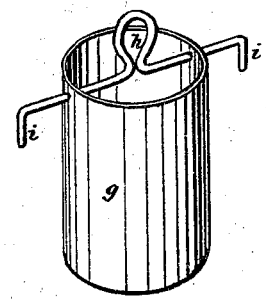

In the accompanying drawing, Figure 1 is a perspective view of my portable fumigator. Fig. 2 is a vertical central section of the same. Fig. 3 is a view of the acid cup or vessel removed from the water-receptable.

The main body or shell A of the fumigator is divided into two parts—a heating-chamber, $a$, designed to receive the alcohol-lamp $b$, and the water chamber or receptable $c$ above the heating-chamber, and with its bottom in proximity to, and so as to be heated by, the lamp $b$ when the latter is lighted. Chamber $b$ is open on one side to admit of the lamp being placed therein or removed therefrom. There is a flat plate, $d$, on the base of the lamp, that slides between and under side guides $e$ on the bottom of chamber $b$. The chamber is perforated on the sides to admit air needed to keep the flame alive.

The handle of the lamp may be used as a means to hold the fumigator in carrying it from place to place; or a separate handle can be provided on the shell A of the article.

To prepare the fumigator for use, the cup or vessel $g$ is supplied with the acid, and the receptacle is filled with water enough to surround the cup on the sides. The cover $f$ is then put on, and the heating-lamp is lighted. The water is thereby heated and volatilizes the acid, causing it to give off fumes. These fumes mingle with the steam rising from the heated or boiling water, and the intermingled products pass off through the perforated cover to permeate the room which is to be disinfected.

Having described my invention, what I claim, and desire to secure by Letters Patent, is—

A portable fumigator for hospital and other uses, consisting of a shell or case, containing an under heating-chamber provided with a lamp, an upper chamber or receptacle to contain water, and an acid cup or vessel suspended within said chamber, the acid-cup and upper chamber being closed by a perforated cover common to both, as shown and set forth.

In testimony whereof I have signed my name to this specification before two subscribing witnesses.

THOS. J. MAYALL.

Witnesses:
JOHN BULKLEY,
CHAS. HALL ADAMS.